Figure 1:
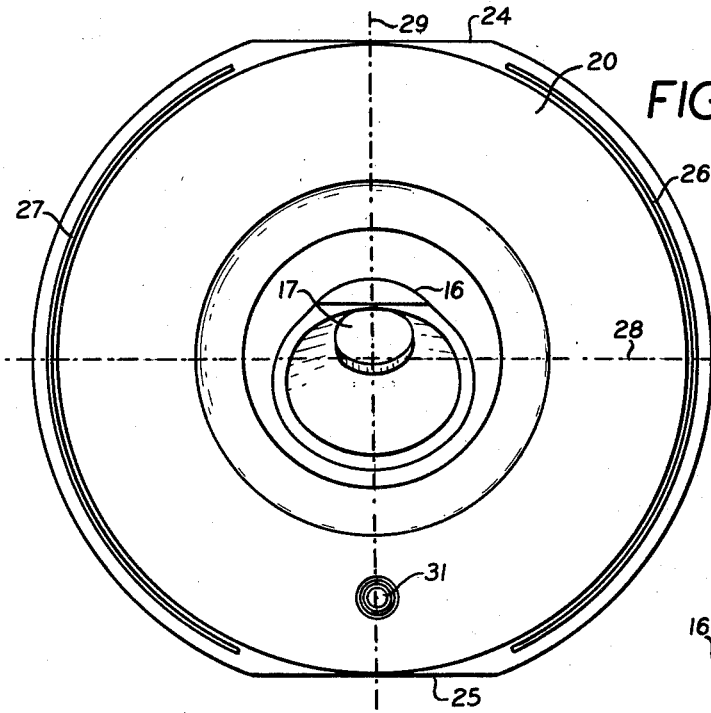

June 22, 1965

E. J. BLIGARD ETAL 3,190,591

CORE ASSEMBLY FOR AN ENGINE MOUNT

Filed Feb. 11, 1963

3 Sheets-Sheet 1

INVENTORS
ERLING J. BLIGARD
ROMOLO H. RACCA

BY

Byerly, Townsend, Watson & Churchill

ATTORNEYS

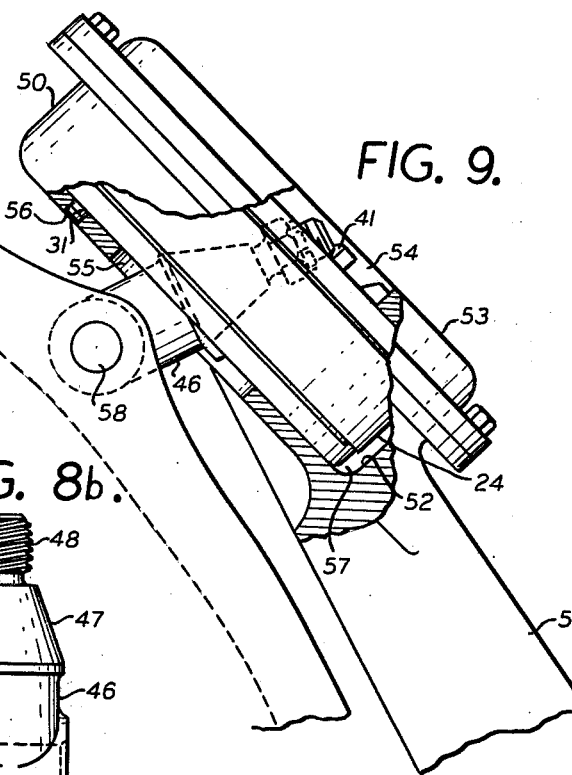
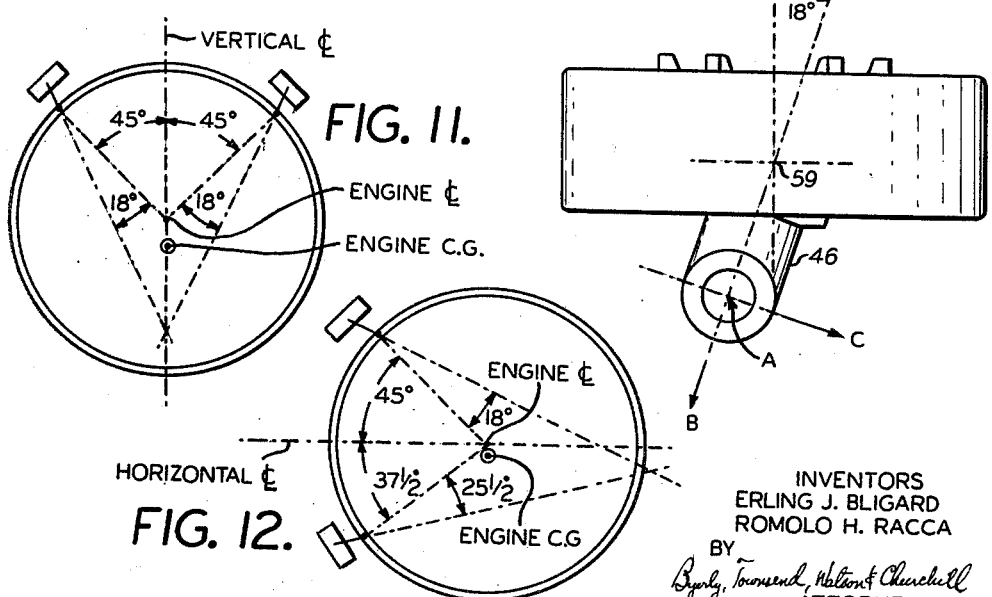

United States Patent Office 3,190,591
Patented June 22, 1965

3,190,591
CORE ASSEMBLY FOR AN ENGINE MOUNT
Erling J. Bligard, Northford, and Romolo H. Racca, Cheshire, Conn., assignors to Cal-Val Research & Development Corp., Glendale, Calif., a corporation of Delaware
Filed Feb. 11, 1963, Ser. No. 257,486
5 Claims. (Cl. 248—5)

The present invention relates to engine mounts for aircraft engines and particularly to a core assembly for such mounts.

Until recent years aircraft engines were commonly slung from a circular ring girdling the engine and carrying a plurality of mounts attached to the engine at spaced points around its circumference. Nacelles either in or under the wings, and the nose of the fuselage, were the conventional points of installation.

The jet age has produced virtually a revolution in aircraft design. No longer restricted by a propeller, the turbo-jet engines can be mounted wherever they can be supplied with adequate air intake and where the exhaust gases have an unimpeded path in the counterthrust direction. The foregoing has resulted in changes in engine mounting philosophy and has created a series of new problems with respect to the construction of the mounts.

When jet engines were first applied to aircraft it was felt that specific vibration isolation for passenger comfort was unnecessary since the turbine type engine operates at a much higher speed of rotation and is not subject to the many unbalances found in a reciprocating engine. Also, the major source of vibration in any aircraft had been the dynamic and aerodynamic imbalance of the propeller. So long as the turbo jet engines were mounted in pods hung under the wings, the limber pod and wing structure acted as a vibration isolator for the low level of engine unbalance. However, attempts are now being made to couple the engines close to the fuselage, e.g., at the rear. This gives rise to undesirable structurally borne vibration which requires isolation.

It has been found possible to support satisfactorily a turbo jet engine having a weight of, say, 4500 pounds by a three point mounting system either in a side mounted or overhead mounted mode. Two connections are made to the engine at circumferentially spaced locations in a transverse plane near the front of the engine and the third connection is made to the engine near its rear. The present invention is directed to the construction of a universal core assembly for use interchangeably in the two such front or forward engine mounts for either mounting mode mentioned above. The details of construction of the rear mount form the subject of a separate patent application filed contemporaneously herewith by the same joint inventors and will not be presented herein.

According to the present invention there is provided a core assembly for an engine mount having a disk-like configuration and comprising a rigid core plate and elastomeric material joined together; the core plate having a hub located at the center of the disklike assembly with a through bore for receiving an engine mounting element, a web radiating from the hub, and a rim portion extending generally normal to the web and joined by the web to the hub, both the web and the rim portion being embedded in the elastomeric material.

Figure 4:
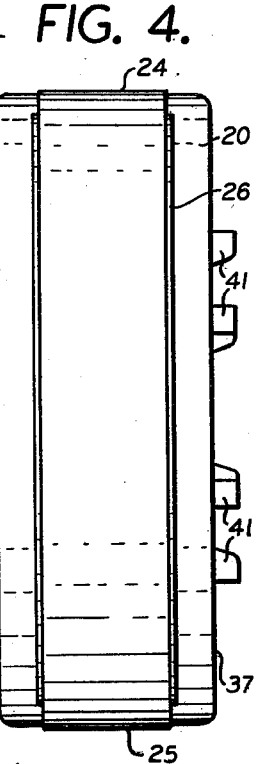
Figure 2:
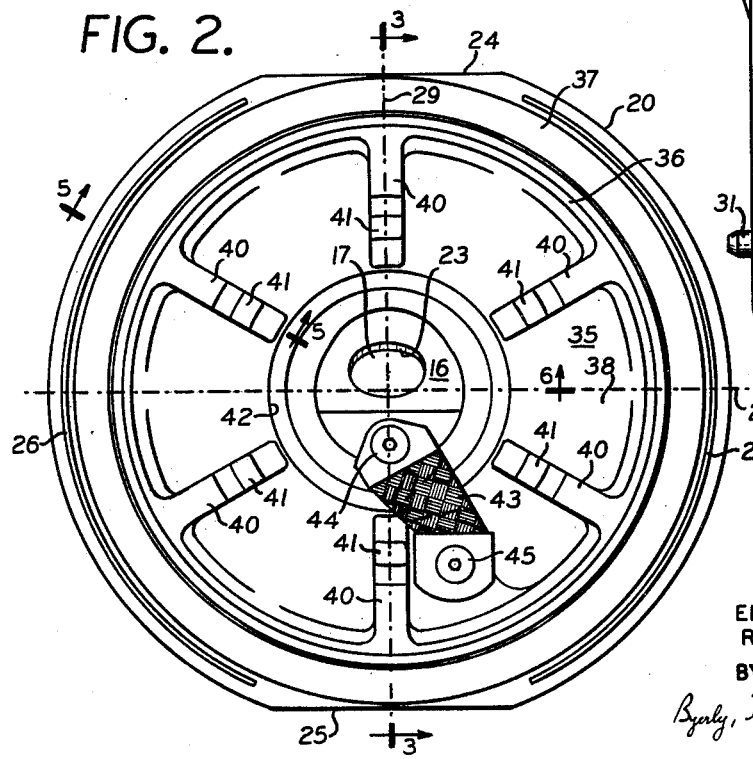
Figure 3:
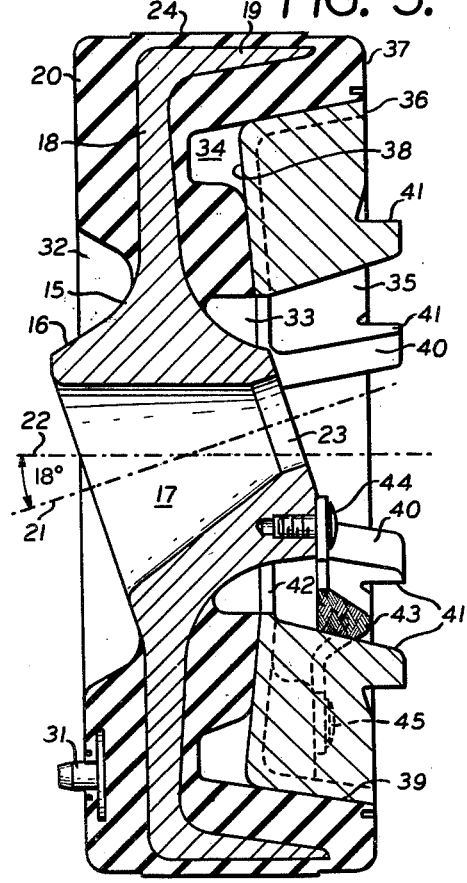
Figure 5:
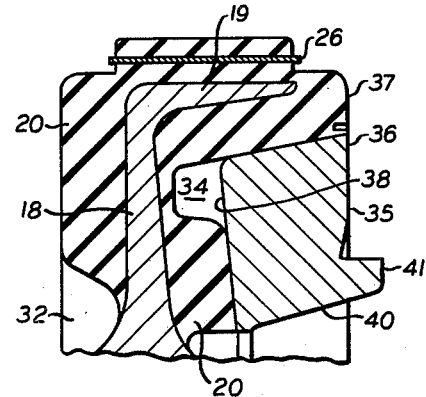
Figure 6:
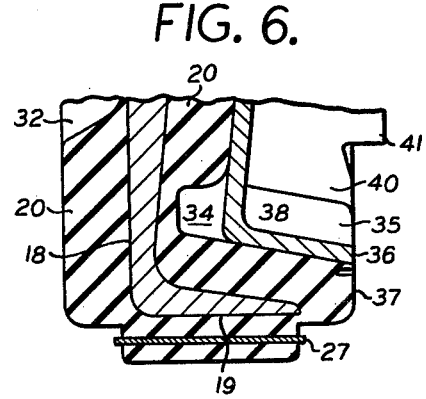
Figure 7:
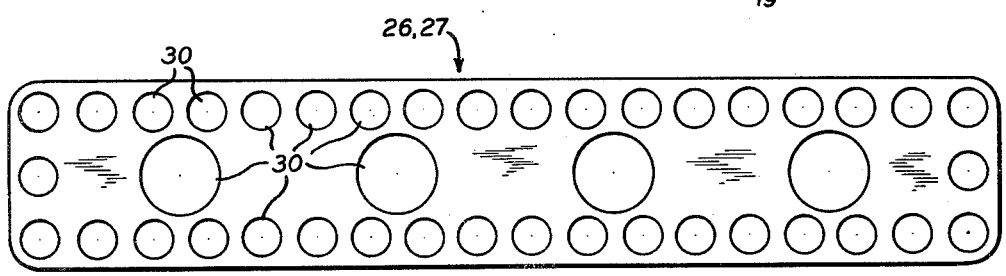

The invention will be better understood after reading the following detailed description of the presently preferred embodiment thereof with reference to the appended drawings in which:

FIGURE 1 is a front elevational view of a core assembly embodying the present invention;
FIGURE 2 is a rear view of the core assembly of FIGURE 1;
FIGURE 3 is a sectional view of the core assembly taken along the line 3—3 in FIGURE 2;
FIGURE 4 is a side view of the core assembly;
FIGURE 5 is a fragmentary sectional view taken along line 5—5 in FIGURE 2;
FIGURE 6 is a fragmentary sectional view taken along line 6—6 in FIGURE 2;
FIGURE 7 is a plan view of one of the two arcuate metal segments embedded in the core assembly;
FIGURES 8a and 8b are front and side elevational views respectively of the cone bolt used to fasten an engine to the core assembly;
FIGURE 9 is an assembly view showing the core assembly of FIGURE 1 installed in a housing and its relation to the mounting flange of an engine;
FIGURE 10 is a schematic diagram to show the force axes used in defining the stiffness characteristics of the core assembly;
FIGURE 11 is a schematic diagram showing the disposition of the mounts employing the core assemblies of the invention when mounting an engine from overhead; and
FIGURE 12 is a schematic diagram similar to FIGURE 11 but showing the disposition of the mounts when mounting an engine from the side.

The core assembly will now be described with reference to FIGURES 1 to 7 to which attention is now directed. It will be seen that the assembly has a disklike configuration being formed with generally parallel front and rear walls and a generally cylindrical periphery.

The assembly includes a rigid core plate 15 having a hub 16 located at the center of the assembly with a through bore 17 for receiving an engine mounting element to be described later. The core plate 15 is further provided with a generally planar web 18 radiating from the hub and a cylindrical rim portion 19 extending generally normal to the web 18 and joined by it to the hub 16. Both the web 18 and the rim portion 19 are embedded in elastomeric material 20.

The axis of the bore 17 and the axis of the core assembly are represented, respectively, by the lines identified by reference numerals 21 and 22. It will be observed that the axis 21 of the bore is inclined and intercepts the axis 22 of the assembly. In the exemplary embodiment being described, the angle between the two axes is 18°. As shown, the bore 17 has a conical configuration with the exception of a short cylindrical area 23.

As best seen in FIGURES 1 and 2, the core assembly is cylindrical with the exception of the two relieved portions 24 and 25 lying on diametrically opposed sides. The relieved portions are intended to provide clearance at their respective locations between the core assembly and the walls of the housing in which the assembly is used.

A pair of arcuate metal segments 26 and 27 are embedded in the elastomeric material 20 parallel to the cylindrical periphery of the assembly and in symmetrically opposed relationship along a diameter shown by the line 28 which is normal to the diameter passing through the relieved portions 24 and 25 and shown by the line 29.

Details of the segments 26 and 27, which are identical, are shown in FIGURE 7. The various perforations 30 are for anchoring the metal to the elastomeric material and for equalizing the pressure on opposite sides of the segment during molding. It will be seen from FIGURES 1 and 2 that the segments 26 and 27 do not overlap or extend into the region adjacent the relieved portions 24 and 25.

The core plate 15 and segments 26 and 27 along with a locating pin 31 are molded directly into the elastomeric material 20 which may be a relatively dead butyl rubber composition. One with a durometer of approximately 50 has been used successfully. The annular spaces 32, 33 and 34 are proportioned to obtain the desired spring rate characteristics in known manner.

The core assembly of the present invention is intended for use in a mount housing having a right cylindrical cavity. As best seen in FIGURE 3, the assembly is molded with a cavity in one face to receive the rigid annular metal member or cap 35. The member 35 is recessed in the face of the assembly such that its rim 36 is flush with the surface 37 of the elastomeric material. It should be noted that member 35 has a slightly concave inner wall or face 38. The concavity of wall 38 matches the taper of the web 18 of the core plate so that the opposing surfaces are parallel. This ensures uniform loading in known manner of the material 20 sandwiched between the two surfaces. It will be understood that core plate 15 is tapered to reduce its weight while retaining the necessary structural strength. A part of the member 35 is disposed in concentric radial opposition to the rim portion 19 of the core plate. Hence, for the same reason as before discussed, the periphery of member 35 is inclined or tapered at 39 to maintain parallelism with the inner surface of the rim portion 19.

As best seen in FIGURE 2, the member 35 is provided with a plurality of radial ribs 40 which serve to strengthen the inner wall 38. At the same time the ribs 40 carry the fingers or extensions 41 (see FIGURE 4) which serve to locate the core assembly in the cover plate of the housing to be described later. The hollow nature of member 35 is for weight reduction and economy, while central opening 42 provides access to the hub 16. The member 35 is arranged to fit snugly into the molding and preferably is bonded in place by a suitable adhesive such as one of the epoxy cements. Finally, a pliant electrically conductive connection or grounding strap 43 is secured by threaded fasteners 44 and 45 to the hub of the core plate and to the member 35, as shown.

FIGURES 8a and 8b illustrate the cone bolt element or stem 46 which is used to connect the core assembly to the engine. Bolt 46 has a conical shank portion 47 which is arranged to fit accurately within the conical bore 17 in the hub 16 of the core plate 15. The end 48 of the bolt is threaded to receive a suitable fastening nut, while the opposite end is provided with a transverse bore 49. Since the structure resembles an eyebolt, the bore 49 will be referred to for convenience as the eye of the cone bolt.

Reference should now be made to FIGURE 9 which illustrates the manner in which a core assembly incorporating the invention may be used. A mount housing 50 is formed at the end of a structural member 51 forming part of the airframe. The housing 50 is provided with a right cylindrical cavity 52 and a removable cover plate 53. The cover plate 53 is provided with an opening 54 having a diameter to receive the fingers 41 of the core assembly. The bottom of the housing 50 has an opening 55 to accommodate the cone bolt 46. Proper orientation of the core assembly is ensured by the aperture 56 in the housing 50 which receives the locating pin 31. It will be apparent that this positions the relieved portions of the core assembly with their axis 29 lying in the plane of the paper. Hence, a gap appears in FIGURE 9 at 57 between the wall of the housing 50 and the core assembly. It will be understood that beyond the relieved portions the periphery of the core assembly will make a sliding to snug fit with the housing. The housing is arranged when the cover 53 is secured in place to apply a slight squeeze or compression to the core assembly.

The engine to be mounted should be provided with a double flange or other clevis-like structure between which the cone bolt 46 can be inserted and secured by a pin or bolt 58. It will be clear that the cone bolt is free to oscillate in the plane of the paper around the axis of the pin 58 relative to the engine in the absence of external restraint. By the same token, the manner in which the cone bolt is pinned to the engine precludes all movement relative to the engine in a direction normal to the paper, that is, in a direction coinciding with the axis and thrust direction of the engine.

When an engine is installed, the core assembly is first secured in its housing, the cone bolt is secured to the engine, and the cone bolt is then inserted in the core assembly. Finally, a castle nut, or other suitable nut, is threadedly secured to the threaded end of the cone bolt.

It will now be observed that the engine is connected electrically to the core plate of the mount by means of the metal cone bolt. In turn, the core plate is electrically connected by strap 43 to the cap 35 which is engaged by the cover plate 53 of the housing. In this manner the engine is grounded electrically to the airframe.

The characteristics of the core assembly can be defined best by referring to FIGURE 10. As previously mentioned, the cone bolt axis makes an angle of 18° with the axis of the core assembly. Three force axes, A, B and C, are represented in this figure. The A axis coincides with the axis of the eye in the cone bolt 46, it being understood that the cone bolt is constrained to translate laterally in the plane common to both the axis of the eye and of the cone bolt itself. Axis B coincides with that of the cone bolt while axis C is mutually perpendicular to both A and B. Forces directed along A and B tend to impart pure translatory motion to the core plate of the core assembly while a force along axis C develops a rotational moment about the point 59, the centroid of the system. If the body of the core assembly is confined in a housing duplicating its intended environment and the housing is immobilized, then forces applied to the cone bolt and directed along the various axes will result in a measurable strain. The ratio of the force to strain represents the stiffness along the axis.

The present invention resulted from the need for providing an engine mount for a specific application wherein the dynamic stiffness characteristics computed as necessary for optimum vibration isolation were in the ratio of 6.7:3:1 for the three axes, respectively, defined above. The core assembly described herein was discovered to provide the closest approach to that desired. A typical sample of the core assemblies constructed in accordance with this invention was measured to determine its actual dynamic stiffness characteristics for the three axes at a temperature of 125° F. The results are tabulated below.

| Axis: | Stiffness (lbs./inch) |
|---|---|
| A | 336,000 |
| B | 189,000 |
| C | 62,000 |

The above values are in the ratio of approximately 5.4:3:1, which is deemed sufficiently close to the theoretical optimum as to constitute a practical optimum.

FIGURES 11 and 12 illustrate, diagrammatically, typical installations of front engine mounts employing the core assemblies of the invention. An overhead mounting arrangement is shown in FIGURE 11. The points of attachment of the cone bolts are located on radii making an angle of 45° to the vertical on both sides of the vertical. The mounts are shown positioned such that the axis of each cone bolt makes an angle of 18° to the radius drawn from the engine centerline to the pin through the respective cone bolt. Two mounts of this type are capable of handling the entire thrust capability of a typical turbo jet engine. Specifically, the mounts have been constructed to handle a maximum thrust load far in excess of 16,000 lbs. As will be explained in the copending application mentioned above, the single rear mount has negligible stiffness in the thrust direction. The rear mount is positioned on the vertical centerline of the engine and contributes to the support of the engine.

Side mounting is illustrated in FIGURE 12. Shown are the locations of the two front mounts described herein. Not shown is the rear mount which is located on the horizontal centerline of the engine. This rear mount is capable of contributing to the support of all loads in a plane parallel to the plane of the paper but has negligible stiffness in the thrust direction. It should be noted that the front mounts are not placed symmetrically. The upper mount is at the 45° point from the horizontal, but the lower mount is only 37½° from the horizontal. Also, the axis of the lower mount cone bolt is directed at an angle of 25½° to the radial line connecting the cone bolt eye to the centerline of the engine.

It will be seen that the one core assembly can be used universally in any mounting position. Thus, if a single aircraft has both overhead and side mounted engines, only one core assembly need be stocked for the front mounts.

The invention has been described with reference to a presently preferred embodiment thereof. Those skilled in the art will understand that changes may be made in the specific details without departing from the true spirit of the invention as defined in the appended claims.

What is claimed is:

1. A core assembly for an engine mount having a disklike configuration and comprising a rigid core plate and elastomeric material joined together, said core plate having
   (a) a hub located at the center of the disklike assembly with a through bore for receiving an engine mounting element,
   (b) a web radiating from said hub, and
   (c) a rim portion extending generally normal to said web and joined by said web to said hub,
both said web and said rim portion being embedded in said elastomeric material, the periphery of the assembly being cylindrical with the exception of two relieved portions lying on diametrically opposed sides, and a pair of arcuate metal segments embedded in the elastomeric material parallel to the cylindrical periphery of the assembly and in symmetrically opposed relationship along a diameter normal to the diameter passing through the relieved portions.

2. A core assembly for an engine mount having a disklike configuration and comprising a rigid core plate and elastomeric material joined together, said core plate having
   (a) a hub located at the center of the disklike assembly with a through bore for receiving an engine mounting element,
   (b) a web radiating from said hub, and
   (c) a rim portion extending generally normal to said web and joined by said web to said hub,
both said web and said rim portion being embedded in said elastomeric material, and a rigid annular member recessed in a face of the disklike assembly so that at least a part of the member is disposed in concentric radial opposition to said rim portion, and elastomeric material separating said rim portion and said web respectively from the periphery and inner face of said annular member.

3. A core assembly according to claim 2, wherein said annular member is provided with means engageable by a housing for restricting its lateral movement.

4. A core assembly according to claim 2, wherein said core plate and said annular member are joined by a pliant electrically conductive connection.

5. An engine mount comprising a housing with a right cylindrical cavity and a central opening in at least one end wall, a disklike core assembly disposed co-axially within said cavity, asid core assembly having a rigid core plate and elastomeric material joined together, the core plate being disposed normal to the axis of the cavity and having a hub located at the center of the disklike assembly with a through bore aligned with the opening in the wall of the housing for receiving an engine mounting element, a web radiating from said hub, a rim portion extending generally normal to said web and joined by said web to said hub, both said web and said rim portion being embedded in said elastomeric material with the rim portion spaced concentrically by said elastomeric material from the cylindrical wall of said housing, said core assembly having additionally an annular rigid member recessed in that face thereof which is remote from the end wall of the housing containing said opening, at least a part of the annular member being disposed in concentric radial opposition to said rim portion, elastomeric material separating said rim portion and said web respectively from the periphery and inner face of said annular member, and means on said housing and said annular member cooperating to restrict lateral movement of said annular member relative to the housing.

References Cited by the Examiner
UNITED STATES PATENTS

| | | | |
|---|---|---|---|
| 2,332,264 | 10/43 | Sauer | 248—7 |
| 2,385,759 | 9/45 | Henshaw | 248—5 |
| 3,101,228 | 8/63 | Olowinski | 248—358 X |

CLAUDE A. LE ROY, *Primary Examiner.*